United States Patent
Koban et al.

(10) Patent No.: US 6,966,432 B2
(45) Date of Patent: Nov. 22, 2005

(54) DRIVE MECHANISM FOR A CONVEYOR WITH STRETCHING COMPENSATION MEANS

(75) Inventors: Johannes Koban, Stuttgart (DE); Michael Neuber, Marbach (DE); Frank Rahnfeld, Reichelsheim (DE)

(73) Assignee: Bosch Rexroth AG, Stuttgart (DE)

( * ) Notice: Subject to any disclaimer, the term of this patent is extended or adjusted under 35 U.S.C. 154(b) by 83 days.

(21) Appl. No.: 10/621,883

(22) Filed: Jul. 17, 2003

(65) Prior Publication Data

US 2004/0055855 A1 Mar. 25, 2004

(30) Foreign Application Priority Data

Aug. 14, 2002 (DE) .......................... 102 37 277

(51) Int. Cl.⁷ .......................... B65G 23/14; B65G 23/06
(52) U.S. Cl. ........................ 198/833; 198/834
(58) Field of Search ............................. 198/833, 834, 198/835, 845, 850, 852

(56) References Cited

U.S. PATENT DOCUMENTS

| 3,980,174 A | * | 9/1976 | Conrad ........................ 198/835 |
| 4,179,025 A | | 12/1979 | Piette et al. |
| 4,337,672 A | * | 7/1982 | Shiber ......................... 198/834 |
| 4,867,733 A | | 9/1989 | Yamanoi et al. |
| 5,402,877 A | * | 4/1995 | Thiele et al. ................ 198/731 |
| 5,791,455 A | * | 8/1998 | Clopton ....................... 198/779 |

FOREIGN PATENT DOCUMENTS

| DE | 35 22 719 A1 | 1/1986 |
| DE | 38 01 865 A1 | 9/1988 |
| DE | 40 04 757 A1 | 8/1991 |
| DE | 200 06 278 U1 | 1/2001 |
| DE | 698 07 407 T2 | 9/2003 |

* cited by examiner

Primary Examiner—Gene O. Crawford
(74) Attorney, Agent, or Firm—Michael J. Striker

(57) ABSTRACT

The drive mechanism (10) has a drive member (12) and a flexible conveying member (14). The engaging elements (12b) of the drive member (12) have an engaging element spacing (t1), while the associated counter elements (14b) of the conveyor member 14 have a counter element spacing (t2). According to the invention the engaging element spacing (t1) of the engaging elements (12b) is larger than the counter element spacing (t2) of the counter elements (14b) of the conveying member in order to compensate for conveyor member stretching in operation. In a preferred embodiment the conveying member is a flexible conveyor chain and the drive member (12) is a toothed drive wheel. In another preferred embodiment the ratio of the engaging element spacing (t1) of the drive member (12) to the counter element spacing (t2) of the conveying member (14) is between about 1.01 and about 1.10.

5 Claims, 1 Drawing Sheet

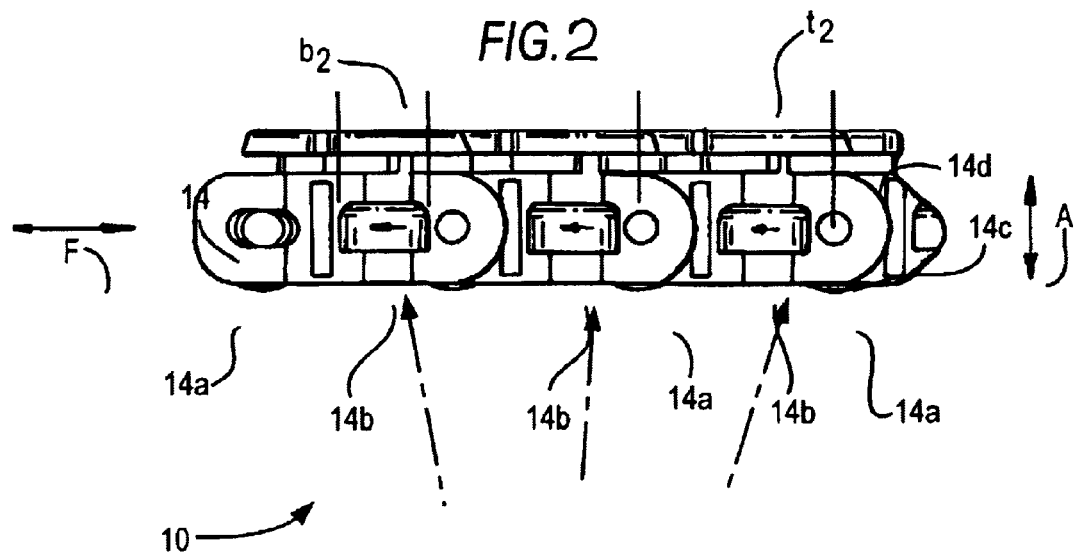
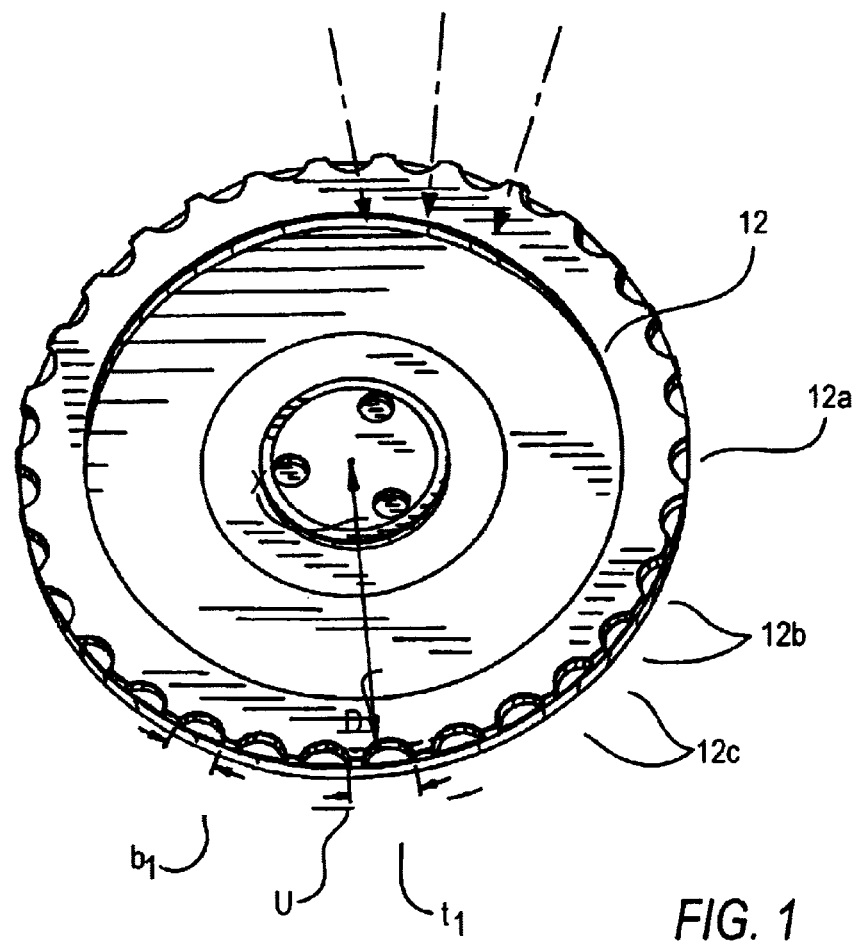

DRIVE MECHANISM FOR A CONVEYOR WITH STRETCHING COMPENSATION MEANS

BACKGROUND OF THE INVENTION

The present invention relates to a drive device for a conveyor, comprising a drive member with a plurality of engaging elements arranged on the drive member with an engaging element spacing and a flexible conveying member with a plurality of counter elements arranged on the conveyor chain with a counter element-spacing, wherein the engaging elements and the counter elements are arranged so that they can engage with each other so that the conveying member can be driven with the drive member.

Drive devices of this kind, for example, are used in continuous conveyors for manufacturing and assembly apparatus, such as from the catalog "Chain Conveyor System—Varioflow" of Robert Bosch GmbH. This continuous conveyor includes a flexible conveying member, for example a special chain or a special toothed belt, for transporting the conveyed goods. Usually a drive wheel is used as the drive member, for example, with engaging elements in the form of teeth. By form-fitting or force-locking engagement of the engaging elements of the drive member with the counter elements of the conveying member the drive member can exert a force on the flexible conveying member, which drives the conveying member in the conveying direction. The respective division spacing between engaging elements of the drive member and counter elements of the conveying member in drive device of the prior art is the same.

The drive member and the conveying member are usually made from different materials, for example from two different plastic materials suitable for the respective applications. The selection of the respective plastic materials occurs according to a series of criteria, among others wear resistance, strength, durability, friction, manufacturing cost and more. In continuous conveyors that are currently known high tension or pulling force and temperatures influences lead to stretching of the conveyor member. As a result forces, noise and a partial lifting of the conveying member from the drive member occur in the vicinity of the changing engagement of the conveying member and the drive member.

SUMMARY OF THE INVENTION

It is an object of the present invention to provide a drive device of the above-described kind, in which the stretching of the conveying member because of high tension and temperature influences within the drive device is at least partially compensated so that the form-fitting and force-locking engagement of the drive member with the conveying member is guaranteed.

This object is attain in a drive device for a conveyor, which comprises a drive member with a plurality of engaging elements arranged on the drive member with a predetermined engaging element spacing and a flexible conveying member with a plurality of counter elements arranged on the conveying member with a predetermined counter element spacing, wherein the counter elements of the conveying member are arranged so that they can engage with the engaging elements of the drive member so that the conveying member can be driven with the drive member.

According to the invention the engaging element spacing of the engaging elements on the drive member is larger than the counter element spacing of the counter elements on the conveying member.

Because of the structure of the drive member and conveyor member according to the invention always at least one engaging element is engaged with a counter element of the conveying member in the vicinity of the changing engagement of the conveying member and the drive member. If stretching of the conveying member because of high tension and/or temperature effects occurs, an increasing number of engaging elements of the drive member and the counter elements of the conveying member come into contact with each other, whereby the force transmission of the drive mechanism is increased. Thus according to the invention the stretching of the conveying member, which is unavoidable in practice, leads to an increase in the prevailing force transmission. At the same time the forces and the like occurring in the state of the art are largely avoided.

If one starts then with a conventionally structured drive device or drive mechanism for a conveyor, a drive device according to the invention can be provided in a simple manner. In a preferred embodiment of the drive device according to the invention the distance between two successive engaging elements of the drive member is made larger than a corresponding width of the counter elements measured in the conveying direction of the conveying member. That means that the shape or form of the engaging elements and/or teeth is not changed, but only their spacing, going from the prior art drive device to the drive device according to the invention.

Preferably the ratio of the engaging element spacing of the drive member to the counter element spacing of the conveying member is between about 1.01 and 1.10, and preferably is 1.05.

Especially a uniform, noise-free and trouble-free operation of the conveying member is obtained with the above-described drive device or drive mechanism according to the invention. This takes place independently of the respective operating conditions, especially the load, the tension, the operating temperature and other parameters. Satisfactory force guidance can be guaranteed with the conveying member by the uniform contact of the conveying member with the drive member. Especially slipping of the elongated conveying member out of engagement with the drive member is avoided. At the same time a reduced friction on the slide bars, which embrace the drive member, is reduced.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 1 is a perspective view of a drive wheel of the drive mechanism according to the invention; and FIG. 2 is a side view of the conveyor chain from the drive mechanism according to the invention.

DETAILED DESCRIPTION OF THE INVENTION

In FIGS. 1 and 2 the reference number 10 designates the drive mechanism according to the invention. It comprises a drive wheel 12 and a conveyor chain 14.

The drive wheel 12 is serrated or toothed on its outer periphery 12a, which means that it includes a plurality of engaging elements, specifically teeth, 12b, which engage with the conveyor chain 14. The engaging elements (teeth) 12b are separated from each other by indentations 12c. The engaging element spacing on the drive wheel 12, which means the interval, with which the engaging elements 12b are spaced from each other, is indicated in FIG. 1 with t1. The width of the indentation 12c is designed with b1.

The conveyor chain 14 is assembled from a plurality of chain members 14a. These chain members 14a include counter elements 14b on their side surfaces, which engage with the drive wheel 12 of the conveyor chain 14. The counter element spacing of the conveyor chain 14, which means the spacing between successive pivot axes 14c of the conveyor chain 14, is designated by the reference number t2 in FIG. 1. The width of the counter elements 14 in the conveying direction F is designated with b2.

According to the invention the engaging element spacing t1 of the drive wheel 12 has a slightly larger value then the counter element spacing t2 of the conveyor chain 14. Furthermore the indentations 12c between the engaging elements (teeth) 12b of the drive wheel 12a have a width b1, which is larger than the width b2 of the counter elements 14b of the conveyor chain 14, as measured in the conveying direction F of the conveyor chain. Because of that at least one engaging element (tooth) 12b always is engaged with a counter element 14b of the conveyor chain 14 in the region of changing engagement of the drive wheel 12 with the conveyor chain 13. If the conveyor chain 14 stretches due to high tension or temperature influences, more engaging elements (teeth) 12b and counter elements 14b come into contact with each other, whereby the total force transmitted by the drive mechanism 10 increases.

Additionally the conveyor chain 14 is still a flexible chain, which can bend in all directions, not only about the axes 14c, but also in the direction A perpendicular to the supporting surface 14d for the objects. In this latter case lateral bending occurs in the drive mechanism shown in FIG. 1, since the conveyor chain 14 is engaged with the toothed drive wheel 12 with its lateral counter elements 14b. However the dimensioning of the engaging element spacing of the drive wheel 12 and the conveyor chain 14 according to the invention is particularly advantageous for applications in which the conveyor chain bends around the axes 14c.

Furthermore the engaging element spacing is determined at a radial spacing D from the axis X, which corresponds to the positions of the pivot axes 14c of the conveyor chain 13 during complete engagement or full engagement on the teeth of the drive wheel 12 (peripheral curve U).

The disclosure in German Patent Application 102 37 277.2 of Aug. 14, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a drive mechanism for a conveyor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A drive device for a conveyor, said drive device comprising
   a drive member (12) with a plurality of engaging elements (12b) arranged on the drive member with a predetermined engaging element spacing (t1);
   a flexible conveying member (14) with a plurality of counter elements (14b) arranged on the conveying member (14) with a predetermined counter element spacing (t2), so that said engaging elements (12b) of the drive member (12) are arranged to engage with the counter elements (14b) of the conveying member (14) so that the conveying member is driven with the drive member;
   wherein the engaging element spacing (t1) of the engaging elements (12b) on the drive member (12) is larger than the counter element spacing (t2) of the counter elements (14b) of the conveying member (14); and
   wherein a ratio of said engaging element spacing (t1) of the drive member (12) to said counter element spacing (t2) of the conveying member (14) is between about 1.01 and about 1.10.

2. The drive device as defined in claim 1, wherein a distance (b1) between two successive ones of said engaging elements (12b) is larger than a width (b2) between adjacent ones of said counter elements (14b) of the conveying member (14), as measured in a conveying direction (F) of the conveying member.

3. The drive device as defined in claim 1, wherein said ratio is 1.05.

4. The drive device as defined in claim 1, wherein said drive member is a drive wheel.

5. The drive device as defined in claim 1, wherein said conveying member is a flexible conveyor chain.

* * * * *